United States Patent [19]

Kemmerling

[11] 4,259,137
[45] Mar. 31, 1981

[54] JACKETING STEEL PIPES BY MEANS OF WRAPPING A RIBBON HELICALLY AROUND THE PIPES

[75] Inventor: Karl-Heinz Kemmerling, Moenchengladbach, Fed. Rep. of Germany

[73] Assignee: Mannesmann Aktiengesellschaft, Duesseldorf, Fed. Rep. of Germany

[21] Appl. No.: 108,796

[22] Filed: Dec. 31, 1979

[30] Foreign Application Priority Data

Jan. 5, 1979 [DE] Fed. Rep. of Germany ....... 2900597

[51] Int. Cl.³ ............................................. G05C 15/00
[52] U.S. Cl. ................................... 156/350; 156/195; 156/244.13; 156/378; 156/429
[58] Field of Search ........... 156/350, 187, 188, 244.13, 156/425, 428, 429–432, 195, 368, 378

[56] References Cited

U.S. PATENT DOCUMENTS

| | | | |
|---|---|---|---|
| 3,726,736 | 4/1973 | Wolfenden | 156/195 X |
| 3,814,646 | 6/1974 | Meyer et al. | 156/195 |
| 3,886,338 | 5/1975 | Lokun | 156/429 |
| 3,972,761 | 8/1976 | Landgraf et al. | 156/195 X |

Primary Examiner—David A. Simmons
Attorney, Agent, or Firm—Smyth, Pavitt, Siegemund, Jones & Martella

[57] ABSTRACT

A pipe jacketing and wrapping station includes a pressure roll, urging an extruded ribbon onto axially passing, rotating pipes, arriving in end-to-end abutment. Feelers determine level differences of the pipes adjacent to the pressure roll and cause the end of the trailing pipe to be lowered or lifted as required.

2 Claims, 2 Drawing Figures

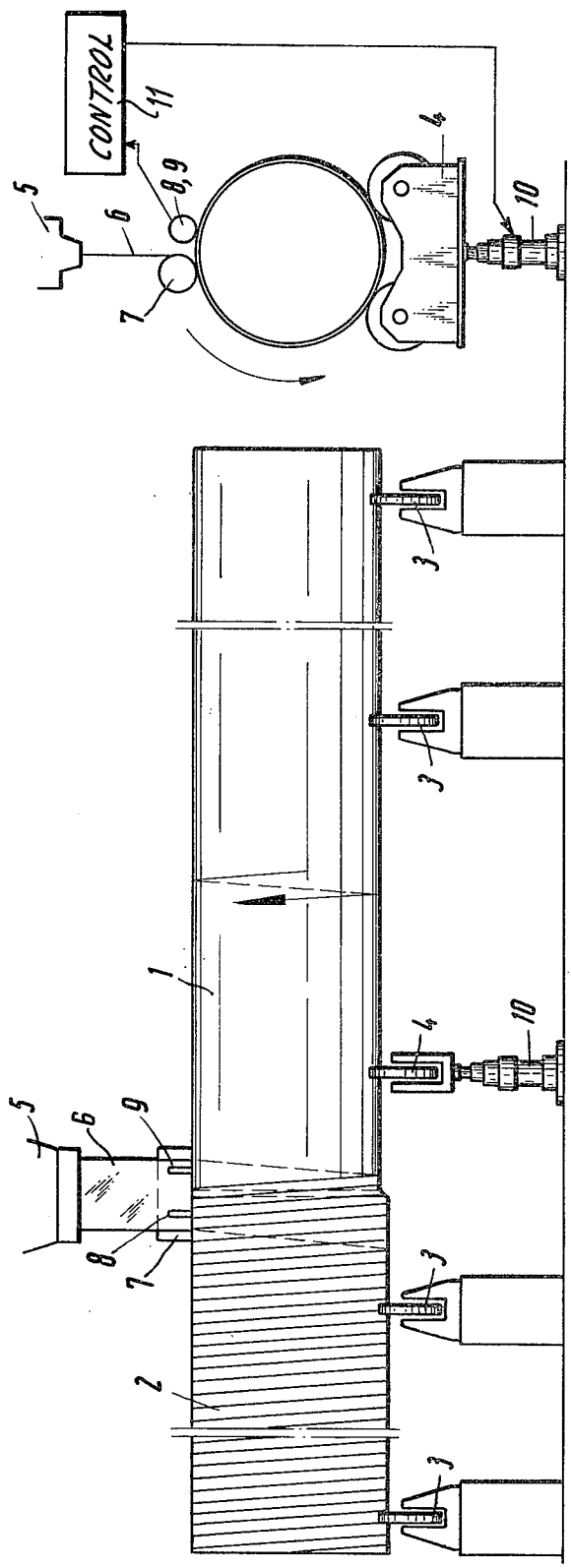

JACKETING STEEL PIPES BY MEANS OF WRAPPING A RIBBON HELICALLY AROUND THE PIPES

BACKGROUND OF THE INVENTION

The present invention relates to providing cover, layer envelope, or jacket upon a steel pipe under utilization of, e.g., a thermoplastic material, in particular polyethylene; and more particularly, the invention relates to helically wind a ribbon, such as a thermoplastic ribbon, upon a steel pipe, the pipe's surface having been covered with a suitable adhesive.

The German printed Pat. No. 17,71,764 describes a device in which a freshly extruded polyethylene ribbon is wrapped around a steel pipe of large diameter. The pipe rotates and advances axially by means of a suitable roller track, resulting in a helical wrapping of the ribbon. A roller urges the ribbon onto the pipe. The adhesive is applied by freshly extruding a ribbon of an adhesive, and wrapping it also onto the pipe to be located between the pipe's surface and the polyethylene ribbon. The roller used to urge and force the plastic ribbon onto the pipe serves for smoothing any unevenness such as may result from an overlap. Also, overlapping edges of the freshly extruded ribbon will be welded together by operation of this pressure roll.

In order to optimize equipment use, sequential pipes should pass through the wrapping and jacketing station in end-to-end relation. However, pipes being curved to some extent, or having an oval cross section, will not be wrapped properly at their two ends because the pressure roll may not work properly on both of the two pipes, which are supposedly abutting but are locally misaligned with level differences of up to 50 mm. Thus, pipes exhibiting any deviation from a true, circular, cylindrical surface will usually pass instead through the wrapping station at a certain distance from each other, such as 250 mm to 300 mm. That will not reduce tumbling of the pipes relative to each other, but does reduce distortion of the ribbon as no uneven joint passes. This approach, however, is disadvantaged by the incurrence of considerable waste because the gap space between the pipes is "wrapped."

Aside from the foregoing, one has to consider the need for separating the pipes from each other which requires cutting the wrapped ribbon. This is quite dangerous because the ribbon is approximately 200° C. hot. Thus, cooling (i,e., a delay) is required before the waste can be handled any further. The waste can, of course, be recycled to some extent; i.e., it may be ground and granulated to be used again in the extruder. Nevertheless, such supplemental processing of the waste is required to save at least some of it.

DESCRIPTION OF THE INVENTION

It is an object of the present invention to provide a new and improved apparatus for wrapping a ribbon around pipes arriving at this wrapping and jacketing station in end-to-end relation.

It is another object of the present invention to wrap steel pipes in thermoplastic ribbon and in a manner which does not incur waste in the wrapping nor does it require recycling of needlessly wrapped ribbon.

It is a specific object of the present invention to improve an apparatus for jacketing steel pipes which preferably includes an extruder for a plastic ribbon, roller track means for axially and rotationally moving pipes past the ribbon payout, e.g., the extruder, in order to obtain helical wrapping of the ribbon around the pipe and which further includes a broad pressure roll, being longer than the ribbon is wide, to force the ribbon onto the passing pipe.

In accordance with the preferred embodiment of the present invention, it is suggested to provide feeler means near or adjacent to the pressure roll, as per the specific object, to ascertain whether or not two abutting or near abutting ends of two pipes on the roller track have a level difference that would be effective in the operating zone of the pressure roll. If such a level difference is detected, the respective trailing pipe is lowered or lifted as required to restore a uniform level so that the pressure roll will urge the ribbon onto both pipes as their end-to-end portions pass for being wrapped. The feeler means is preferably comprised of two axially placed feeler rolls.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which FIG. 1 is a side elevation of a wrapping and pipe jacketing station in accordance with the preferred embodiment of the invention for practicing the best mode; and FIG. 2 is an end view of the station shown in FIG. 1.

Proceeding now to the detailed description of the drawings, the figures show pipes 1 and 2 in end-to-end position on a track being composed of roller pairs 3. The rollers are slightly oblique to obtain some axial advance upon rotating the pipes about their axes. The track includes an additional roller pair 4 mounted on a lifting device 10 which may operate pneumatically, hydraulically, or electrically.

The two pipes 1 and 2 are shown to be of a slightly different diameter at least in the vertical direction; this may be due, for example, to an ovality of pipe 2, or both pipes may be oval, but the long axes are not aligned. The liftable roller pair 4 is positioned and operated to raise, in this instance, the front end of pipe 1 so that the apex lines of the two pipes are horizontally aligned.

An extruder 5 with a broad, slit nozzle 5 extrudes a polyethylene ribbon 6 towards the top of the pipes, and a pressure roll 7, being longer than the ribbon is wide, forces the ribbon onto the respective pipe underneath whenever the abutting ends of two pipes pass, as is shown in FIG. 1 with respect to pipe 1 and 2. In order to adequately wrap the respective two abutting ends, roll 7 must be in a position of urging the ribbon against the surface of both pipes, which means that their respective top line must be exactly aligned, at least right at the operating zone of pressure roll 7.

A feeler or scanning roll 8 and a second such roll 9 respectively scan the surface of the freshly wrapped pipe and the unwrapped, bare surface a little upstream. As long as one and the same pipe is disposed under both feelers, 8 and 9, their position, i.e., elevation or level, differs in the vertical by the thickness of the ribbon (which may be minute). As the next pipe arrives, feeler 9 may be lifted or lowered by the new pipe if the surface portions of the two pipes right at the wrapping point are not exactly aligned. Please note that this occurs when that new pipe is just about to receive the first loop. In the illustrated example, feeler 9 had been lowered as pipe 1 has an apparent diameter in the vertical which is smaller than the adjacent diameter of pipe 2.

A controller 11 responds to any relative imbalance of feelers 8 and 9 and acts on device 10 in order to cause it to lift the pipe (in this case, pipe 1) or to lower it if that were necessary, its purpose being to restore the previous balance in the position of feelers 8 and 9, which means that roll 7 will continue to press the ribbon against both pipes. Therefore, the transition portion between the pipes will be properly wrapped so that both pipe ends are jacketed accordingly.

Of course, the pipes rotate, and their end-to-end portions may be differently misaligned at different azimuths. Feeler 9 will respond to cause device 4 to further lift or lower the leading end of one pipe (here, pipe 1) until pipe 1 is in the scanning range of both feelers. Placing feelers 8 and 9 right at the pressure roll 7 is convenient, but the feelers may well be positioned a little upstream, to give adequate time to the controller and a, possibly, not too fast operating hydraulics.

The gap between the pipes can be minimal, just enough to permit cutting the continuous wrapping downstream from the wrapping and winding station. No waste occurs, so that recycling of an excess wrapping material is not needed.

The invention is not limited to the embodiments described above; but all changes and modifications thereof, not constituting departures from the spirit and scope of the invention, are intended to be included.

I claim:

1. In an apparatus for jacketing pipes with thermoplastic ribbon, the ribbon being extruded and directed towards the pipe to be jacketed, the apparatus including roller track means, on which the pipes to be jacketed arrive in end-to-end relation and, also, causing the pipes to rotate for helically wrapping the extruded ribbon onto the pipe, the apparatus further including a pressure roll disposed above the pipes, to urge the ribbon onto the respective pipe, the improvement in the apparatus comprising:

a pair of axially spaced feelers for monitoring elevation differences of two pipes when passing the pressure roller;

a lifting means being included in the roller track means, for lifting a pipe or pipe end; and control means connected to be operated by the pair of feelers, for operating the lifting means to cause two pipes to have their respective tops horizontally aligned as the end-to-end portions of the pipes pass the pressure roll so that during such passage the pressure roll urges the ribbon onto both pipes.

2. In a steel-pipe-wrapping apparatus which includes a roller track for axially and rotationally moving pipes in end-to-end relation past a pressure roll which urges a ribbon onto the pipe or pipes when passing, the improvement comprising:

feeler means disposed to detect level differences of two pipes whose end-to-end portions are, or are about, to pass the pressure roll, the level difference being effective at the pressure roll; and control means connected to the feeler means to be responsive to any such detected level difference and causing the respective trailing pipe to be lowered or lifted to eliminate the detected level difference, so that said pressure roll can press the ribbon uniformly against both pipes as their end-to-end portions pass the pressure roll.

* * * * *